United States Patent [19]

Garcea

[11] 4,265,206

[45] May 5, 1981

[54] DEVICE FOR DETECTING THE KNOCK PHENOMENA IN INTERNAL COMBUSTION ENGINES HAVING A CONTROLLED-IGNITION DEVICE, BASED ON THE USE OF TEMPERATURE SENSORS

[75] Inventor: Giampaolo Garcea, Milan, Italy

[73] Assignee: Alfa Romeo S.p.A, Milan, Italy

[21] Appl. No.: 65,726

[22] Filed: Aug. 10, 1979

[30] Foreign Application Priority Data

Aug. 11, 1978 [IT] Italy .................. 26738 A/78

[51] Int. Cl.³ .......................................... F02P 5/14
[52] U.S. Cl. ...................................... 123/425; 73/35
[58] Field of Search ............ 123/117 R, 117 D, 148 E, 123/32 EE, 146.5 A; 73/35, 346

[56] References Cited

U.S. PATENT DOCUMENTS

| | | | |
|---|---|---|---|
| 2,660,883 | 12/1953 | Wyczalek | 73/35 |
| 3,939,711 | 2/1976 | Hanaoka | 73/346 |
| 3,983,754 | 10/1976 | Deguchi et al. | 73/346 |
| 4,061,116 | 12/1977 | Saida et al. | 123/146.5 A |
| 4,063,538 | 12/1977 | Powell et al. | 123/146.5 A |
| 4,114,442 | 9/1978 | Pratt | 73/346 |
| 4,133,475 | 12/1979 | Harned et al. | 73/35 |

Primary Examiner—Charles J. Myhre
Assistant Examiner—R. A. Nelli
Attorney, Agent, or Firm—Charles E. Brown

[57] ABSTRACT

In a controlled ignition internal combustion engine, two temperature sensors, one of which is placed in the farthest position relative to the spark plug and the other in the vicinity of the spark plug in a cylinder, generate signals the difference of which is significant for the detection of the knock phenomenon. As the temperature differential of the two sensors exceeds a preselected magnitude, a warning signal may be delivered on the dashboard, or the controlled ignition system of the engine may receive a command for reducing the angle of advance of ignition until ordinary, non-knock conditions are restored for the engine.

4 Claims, 2 Drawing Figures

DEVICE FOR DETECTING THE KNOCK PHENOMENA IN INTERNAL COMBUSTION ENGINES HAVING A CONTROLLED-IGNITION DEVICE, BASED ON THE USE OF TEMPERATURE SENSORS

Devices have already been suggested and manufactured for detecting the knock phenomenon which essentially utilize signals coming from sensors of vibratory phenomena of high frequency which accompany knocking.

The device according to the present invention, conversely, is intended for discriminating the regular combustion of the mixture from the anomalous combustion due to the knocking phenomenon by utilizing the signals coming from temperature probes arranged in the interior of the explosion chamber. The device, in fact, is based on the fact that the knocking phenomenon, especially when the type and the intensity of the phenomenon in question are such as to cause damage to the component parts of the engine which are exposed to the gases in the explosion chamber, originates not only a train of pressure wave of a high frequency in the explosion chamber, but also to an increased heat transfer from the gas to the engine walls and thus to a temperature increase in said walls. Said increased transfer and said temperature rise take place especially in the zone of the explosion chamber in which the anomalous combustion corresponding to knocking occurs: said zone is that in which the mixture burns last and is generally the zone farthest from the sparking plug. It has thus been envisaged to arrange in that zone of the explosion chamber a temperature sensor adapted to sense said increase of the heat transfer which is characteristic of knock. It is known, however, that as the conditions of use of the engine are varied (that is as the RPM and the degree of throttling are varied), the temperature of the internal portion of the explosion chamber varies considerably, and that these variations may be sudden, for example when the throttle is abruptly opened in acceleration.

Abrupt variations of the temperature due to the variation of the conditions of use will thus be felt also by said sensor. In order to discriminate the quick temperature rise in the sensor due to the variation of the conditions of use from the temperature increase which is conversely due to knocking, it has been envisaged to install a second temperature sensor in the explosion chamber but in a zone nearer to the sparking plug and in which the incipient knock phenomenon is never experienced.

The quick temperature increase of this second sensor is experienced only in connection with the abrupt variations of the conditions of use. If an electronic circuit comprising a comparator of two signals receives the signals of the two sensors, the circuit is enabled to discriminate the origin of the phenomenon. Thus, if the temperature increase takes place in both sensors, and thus the two signals are equal or nearly so, there is no knock, whereas, if it takes place in the first sensor only, and thus the relative signal is much rather than the signal coming from the second sensor, knock is experienced. The discrimination can also be obtained when, for example, the sensors are of the thermoelectric type, by connecting in opposition the cables of the two thermocouples and if so the electric circuit receives the voltage differential which is the expression of the temperature differential between the two sensors, and the occurrence of knocking will be evidenced by the circuit whenever such voltage differential exceeds a certain preselected value.

According to a first embodiment, provision is made so that the device according to the present invention is matched to a signalling means, for example a luminous signal, which is arranged on the dashboard so that the driver, if the knock phenomenon occurs due to the coexistence of various factors (poor quality of the fuel, presence of incrustations in the explosion chamber, towing a caravan on a steep hill and so forth), is enabled to reduce the power delivery by the engine until the signal fades away.

According to an alternative embodiment, conversely, provision is made so that the electronic circuit aforesaid is equipped with control means operatively connected to the engine ignition system, a system which is already characterized, as itself, by a basic adjustment of the ignition advance as a function of at least one of the engine parameters, such as the engine RPM. By so doing, the aforementioned means of the electronic circuit, as soon as the occurrence of knock is detected on the basis of the signals coming from the sensors, deliver a command for the quick reduction of the ignition advance relative to the basic adjustment and this until the temperature sensors have signalled to the electronic circuit that knock no longer occurs. On taking into account the fact that while the device enters action for reducing the advance, the aforementioned engine parameters of the basic adjustment, for example the engine RPM, may change, it has been provided as preferable among the various embodiments the one in which the command for the reduction of the advance is concerned with the entire basic regulation and not only the point of such adjustment which corresponds to the parameters which are valid in the instant of time in which knock occurred. In order to avoid that, due to a considerable variation of such parameters, or anyhow of the degree of intensity of use of the engine (for example when passing, after an acceleration, to the constant speed use of the vehicle), the reduction of advance be maintained also when it is no longer required, further means are provided which are capable of commanding a gradual annulment, within a comparatively narrow range, of the reduction of the advance, and this starting from the instant of time when the reduction has been imposed to the system. It is apparent that, if, during such gradual annulment the knock phenomenon appears again, a fresh command is delivered by the device in order to suppress knock.

IN THE DRAWINGS

Figure 1:
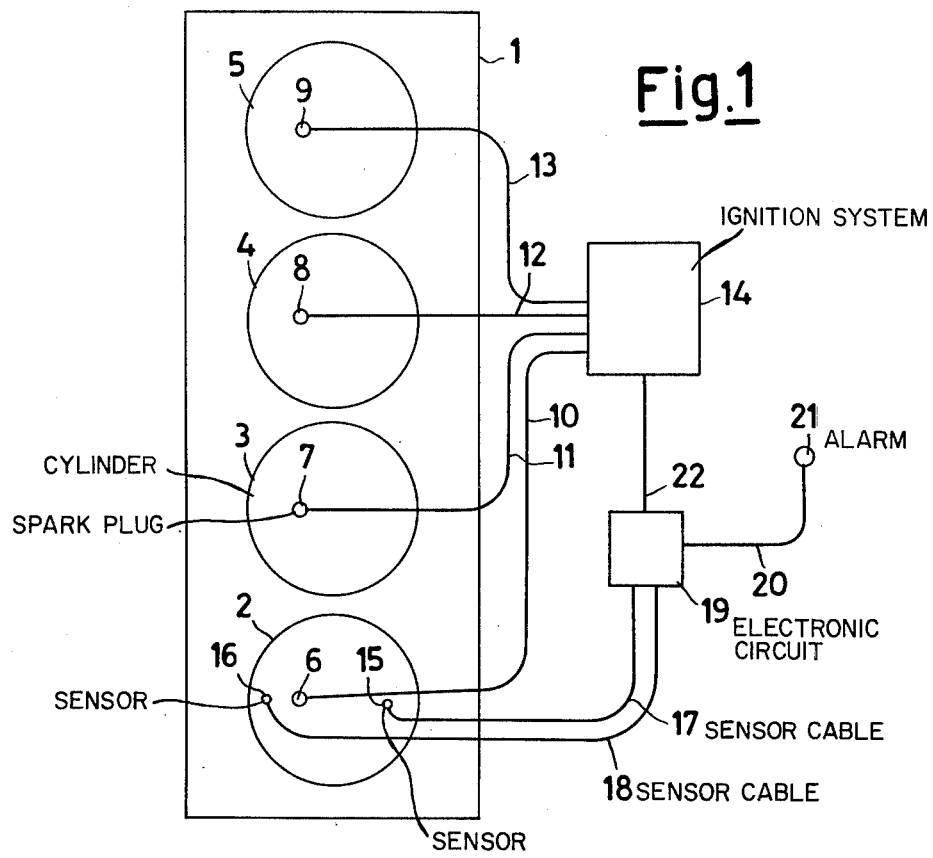
FIG. 1 is a diagrammatic view of the invention in relation to an engine block.

In order that the foregoing may be better understood, FIG. 1 there is shown the engine block 1 (by way of example an in-line-4-cylinder engine has been depicted) as viewed along the direction of the axis of the cylinders, and 2, 3, 4 5 having the sparking plugs 6, 7, 8 and 9 and the ignition cables 10, 11, 12, and 13 which lead the ignition current to the sparking plugs from the ignition system one for which delivers the current to the sparking plugs with a certain basic adjustment of the ignition advance relative to the upper dead center of the pistons corresponding to the several cylinders. Two temperature sensors, which are preferably thermocouples, are arranged in the explosion chamber of the cylinder 2, the sensor 15 in the zone of the explosion chamber which is the farthest from the sparking plug, where the incipient knock phenomenon generally occurs, and the sensor 16 in a zone near to the sparking plug, in which the incipient knock phenomenon does not occur, so that the simultaneous temperature increase signalled by the sensors 15 and 16 can be due only to an increase of the power delivered by the engine when no knock is under way, whereas the temperature increase of the sensor 15 only, or of the sensor 15 only prevailingly over the sensor 16 may be due only to the occurrence of the knock phenomenon. Two cables 17 and 18 connect the sensors 15 and 16 with the electric circuit 19, each of the two cables being composed by the two leads which start from the thermocouples in the case in which the sensors are thermocouples, said electronic circuit 19 having conventional means, consisting of a signal comparator, which are capable of using said signals coming from the sensors in such a way as to distinguish the presence of knock as compared with the normal operation of the engine. In a first version of the device the possible knock signal is sent via the connection 20 to the alarm means 21, for example placed on the vehicle dashboard, said electronic circuit 19 being also equipped, in a second version of the device, with means which are capable to deliver a command for a quick reduction of the advance to the ignition system 14 with which it is operatively connected via the connection 22.

Other means can be provided in the circuit 19, which are capable of cutting off the command for the progessive quick reduction of the advance as soon as they detect that no knock occurs any longer in the engine.

Yet other means can also be provided which, as the command for the quick gradual decrease of the advance is over, are capable of commanding a less rapid gradual increase of the advance so as to restore the advance towards the original value of the basic adjustment.

This temporary correction of the advance relative to the basic adjustment can be carried out along the entire advance curve, and thus the whole field of operation of the engine throughout, or only in a few zones of such a field.

Figure 2:
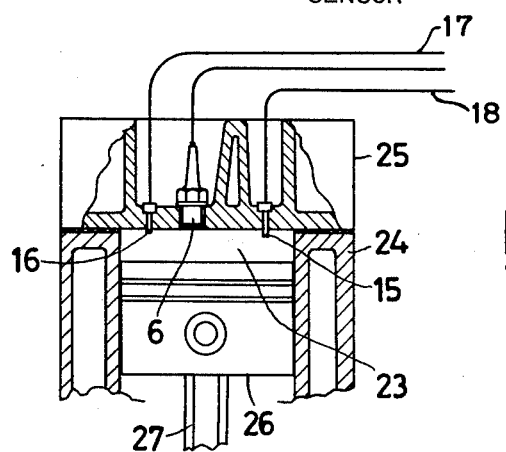
FIG. 2 is a fragmentary sectional view through one cylinder transversely of the engine axis.

In FIG. 2 there are indicated at the piston, the connecting rod 27, both in the position which corresponds to the upper dead center position the explosion chamber 23 in which the spark plug 6 and the two sensors 15 and 16 project, the cylinder block 24 and the engine head 25.

I claim:

1. A controlled-ignition internal combustion engine of the type having a spark plug and a piston for each cylinder, said engine having an ignition system for causing electric discharge at the spark plug with a determined basic regulation of ignition advance relative to the upper dead center of the respective piston, said engine also having a device for detecting the occurrence of the knock phenomenon in an explosion chamber of at least one of the engine cylinders, said device comprising two separate temperature sensors separately arranged in exposed relation in said chamber, one of said sensors being arranged in a zone of said chamber farthest from the spark plug in which generally the phenomenon of incipient knocking is experienced, the other of said sensors being arranged in a zone of said chamber near the spark plug in which said incipient knocking phenomenon does not occur, said device further comprising an electronic circuit for receiving and comparing signals coming from said sensors so as to detect if the engine is operating under knock conditions.

2. An internal combustion engine according to claim 1, characterized in that said electronic circuit is connected with a luminous warning means arranged on the dashboard before the driver's seat so as to signal to the driver the occurrence of said knocking phenomenon.

3. An internal combustion engine according to claim 1, characterized in that said electronic circuit is operatively connected with the ignition system for delivering to said ignition system a command for a quick decrease of the ignition advance relative to the basic advance adjustment as it is detected that the engine is operating under knocking conditions.

4. An internal combustion engine according to claim 3, characterized in that said electronic circuit, after having delivered to the ignition system the command for a rapid gradual decrease of the ignition advance, is operable to cut off the ignition advance change command and thereby stop the gradual reduction of the ignition advance as soon as it is detected that the engine is no longer running under knocking conditions.

* * * * *

UNITED STATES PATENT AND TRADEMARK OFFICE
CERTIFICATE OF CORRECTION

PATENT NO. : 4,265,206

DATED : May 5, 1981

INVENTOR(S) : Giampaolo Garcea

It is certified that error appears in the above-identified patent and that said Letters Patent are hereby corrected as shown below:

In the heading, the title should read --

CONTROLLED-IGNITION DEVICE FOR I.C. ENGINES USING PLURAL

TEMPERATURE SENSORS --.

Column 1, the title should read --

CONTROLLED-IGNITION DEVICE FOR I.C. ENGINES USING PLURAL

TEMPERATURE SENSORS --.

Column 2, line 28, "aforementioned" should read

-- aforesaid --;

Column 2, line 60, after "ders" cancel ", and";

Column 2, line 60, "45" should read -- 4 and 5 --;

Column 2, line 60, cancel "the";

Column 2, line 61, cancel "the";

Column 2, line 63, "one for" should read -- 14 --;

Column 3, line 13, "electric" should read -- electronic --;

Column 3, line 14, "by the" should read -- of --;

Column 3, line 43, cancel "at";

UNITED STATES PATENT AND TRADEMARK OFFICE
CERTIFICATE OF CORRECTION

PATENT NO. : 4,265,206
DATED : May 5, 1981
INVENTOR(S) : Giampaolo Garcea

It is certified that error appears in the above-identified patent and that said Letters Patent are hereby corrected as shown below:

Column 3, line 43, after "piston" insert -- 26 --;

Column 3, line 45, after "position" insert a comma.

Signed and Sealed this

Eighteenth Day of August 1981

[SEAL]

Attest:

GERALD J. MOSSINGHOFF

*Attesting Officer*   *Commissioner of Patents and Trademarks*